(12) United States Patent
Zhang et al.

(10) Patent No.: US 11,541,480 B2
(45) Date of Patent: Jan. 3, 2023

(54) METHOD AND DEVICE FOR MANUFACTURING ALL-LASER COMPOSITE ADDITIVE

(71) Applicant: Ningbo Institute of Materials Technology & Engineering, Chinese Academy of Sciences, Ningbo (CN)

(72) Inventors: Wenwu Zhang, Ningbo (CN); Junke Jiao, Ningbo (CN)

(73) Assignee: Ningbo Institute of Materials Technology & Engineering, Chinese Academy of Sciences, Ningbo (CN)

( * ) Notice: Subject to any disclaimer, the term of this patent is extended or adjusted under 35 U.S.C. 154(b) by 724 days.

(21) Appl. No.: 16/475,100

(22) PCT Filed: Feb. 14, 2017

(86) PCT No.: PCT/CN2017/073492
§ 371 (c)(1),
(2) Date: Jun. 30, 2019

(87) PCT Pub. No.: WO2018/120360
PCT Pub. Date: Jul. 5, 2018

(65) Prior Publication Data
US 2019/0329356 A1   Oct. 31, 2019

(30) Foreign Application Priority Data

Dec. 30, 2016 (CN) .......................... 201611256853.7

(51) Int. Cl.
*B23K 26/342* (2014.01)
*B33Y 10/00* (2015.01)
(Continued)

(52) U.S. Cl.
CPC .......... *B23K 26/342* (2015.10); *B23K 20/008* (2013.01); *B23K 26/032* (2013.01);
(Continued)

(58) Field of Classification Search
CPC .............. B23K 26/342; B23K 26/0624; B23K 26/0821; B23K 26/364; B23K 26/032;
(Continued)

(56) References Cited

U.S. PATENT DOCUMENTS 5,075,966 A   12/1991 Mantkowski
6,424,670 B1 *  7/2002 Sukhman ............. B23K 26/042
                                           219/121.76
(Continued)

FOREIGN PATENT DOCUMENTS

CN   103418985 A   12/2013
CN   103806961 A    5/2014
(Continued)

OTHER PUBLICATIONS

Zhu, Cuiping, "First Search, Application No. 2016112568537", dated Nov. 27, 2017, State Intellectual Property Office.
(Continued)

*Primary Examiner* — John J Norton
*Assistant Examiner* — Simpson A Chen
(74) *Attorney, Agent, or Firm* — Edwin A. Sisson, Attorney at Law, LLC; Jeffrey J. Banyas (57) ABSTRACT

Disclosed is a method for an all-laser hybrid additive manufacturing. After a matrix is obtained by means of selective laser melting forming, a subtractive forming is carried out on the matrix by means of a pulse laser to form a cavity, and the cavity is then packaged to obtain a forming material with an internal cavity structure. A laser precision packaging method is used in the method based on the melting of the laser selective region. Also disclosed is the apparatus, comprising a laser unit (2), a control unit (4) and a forming unit (6). The laser unit is in light path connection with the forming unit, and the control unit is electrically connected with the laser unit and the forming unit respec- (Continued)

tively. The laser unit comprises a first laser light source and a second laser light source. The forming unit comprises a welding unit (68), and the welding unit is controlled by the control unit and is matched with the laser unit for the additive manufacturing.

15 Claims, 4 Drawing Sheets (51) Int. Cl.
| | |
|---|---|
| B33Y 30/00 | (2015.01) |
| B33Y 40/00 | (2020.01) |
| B33Y 70/00 | (2020.01) |
| B23K 26/0622 | (2014.01) |
| B23K 26/082 | (2014.01) |
| B23K 26/364 | (2014.01) |
| B23K 26/06 | (2014.01) |
| B23K 26/26 | (2014.01) |
| B23Q 17/24 | (2006.01) |
| B23K 26/03 | (2006.01) |
| B23K 20/00 | (2006.01) |
| B23K 26/362 | (2014.01) |
| H01S 3/067 | (2006.01) |

(52) U.S. Cl.
CPC ...... *B23K 26/0608* (2013.01); *B23K 26/0624* (2015.10); *B23K 26/0643* (2013.01); *B23K 26/0821* (2015.10); *B23K 26/26* (2013.01); *B23K 26/362* (2013.01); *B23K 26/364* (2015.10); *B23Q 17/2471* (2013.01); *B33Y 10/00* (2014.12); *B33Y 30/00* (2014.12); *B33Y 40/00* (2014.12); *B33Y 70/00* (2014.12); *H01S 3/067* (2013.01)

(58) Field of Classification Search
CPC ............ B23K 26/0608; B23K 26/0643; B23K 26/26; B23K 26/362; B23K 20/008; B33Y 10/00; B33Y 30/00; B33Y 40/00; B33Y 70/00; B23Q 17/2471; H01S 3/067
USPC .................................................. 219/121.69
See application file for complete search history.

(56) References Cited

U.S. PATENT DOCUMENTS

| | | | |
|---|---|---|---|
| 2006/0196858 A1* | 9/2006 | Barron ................. | B41M 5/24 |
| | | | 219/121.69 |
| 2008/0237195 A1 | 10/2008 | Iwasa et al. | |
| 2010/0080688 A1 | 4/2010 | Bezencon et al. | |
| 2011/0185572 A1* | 8/2011 | Wei ..................... | B23K 26/389 |
| | | | 29/418 |
| 2013/0101423 A1* | 4/2013 | Roy ..................... | B22F 10/20 |
| | | | 416/223 R |
| 2014/0271974 A1 | 9/2014 | Hughes | |
| 2016/0354839 A1* | 12/2016 | Schick ................. | B22F 10/10 |
| 2017/0326867 A1* | 11/2017 | Hartke ................. | B33Y 30/00 |
| 2018/0272473 A1* | 9/2018 | Baubeau ............. | B23K 26/354 |

FOREIGN PATENT DOCUMENTS

| | | |
|---|---|---|
| CN | 203807559 U | 9/2014 |
| CN | 104384936 A | 3/2015 |
| CN | 105382259 A | 3/2016 |
| CN | 105499904 A | 4/2016 |
| CN | 105538728 A | 5/2016 |
| JP | 2011157964 A | 8/2011 |
| WO | 2015156765 A1 | 10/2015 |

OTHER PUBLICATIONS

Seiderer, Jens, "Supplementary European Search Report, Application No. EP 17 88 7563", dated Jul. 24, 2020, European Patent Office.
First Office Action—Application No. 201611256853.7, The State Intellectual Property Office of People's Republic of China.

* cited by examiner

METHOD AND DEVICE FOR MANUFACTURING ALL-LASER COMPOSITE ADDITIVE

PRIORITIES AND CROSS REFERENCES

This Application claims priority from International Application No. PCT/CN2017/073492 filed on 14 Feb. 2017 which claims priority from Chinese Application No. 201611256853.7 filed on 30 Dec. 2016 the teachings of each of which are incorporated by reference herein in their entirety.

TECHNICAL FIELD

The present application relates to a material laser processing method, and belongs to the field of material processing.

BACKGROUND

Selective Laser Melting technology can realize the formation of complex structural parts, but the forming precision is low, the surface finish is poor, and the resolution is low. Generally, subsequent processing is needed to improve the surface finish. Subsequent processing generally selects two methods. One method is to introduce addition and subtraction materials in additive manufacturing, which can improve the macro-scale finish, but the reliability and durability of the tool are poor, and the resolution is low, especially the processing capability for a microchannel is insufficient. The other one is to introduce ultra-fast laser subtractive technology into laser additive manufacturing, which can realize the precision forming and processing of microchannels of complex internal cavity structures. Both of these methods are faced with the problems of powder residue inside the microchannel, the powder adhering to the upper wall of the channel, and difficulty in processing the overhang surface, which affect the final use effect of the formed workpiece, especially in manufacturing the key parts for aerospace that requires strict processing quality. These methods are difficult to meet the requirements of high smoothness, high cleanliness, and high precision. In addition, neither of the two methods can realize the processing of the overhang surface, which limits the application scope of the technology.

SUMMARY OF THE INVENTION

According to one aspect of the present application, a method for all-laser hybrid additive manufacturing is provided. On the basis of selective laser melting (SLM), a laser precision packaging method is used to solve the problem of forming microchannels in the material, especially the forming of overhang surface, to solve the problem of microchannel powder residue and to meet the requirements of high precision, high finish and high cleanliness of aerospace key parts processing. The addition and subtraction of the all-laser hybrid additive manufacturing method are all realized by laser. The method comprises the following steps: after a matrix is obtained by means of selective laser melting forming, a subtractive forming is carried out on the matrix by means of a pulse laser to form a cavity, and the cavity is then packaged to obtain a forming material with an internal cavity structure.

Preferably, the method comprises the steps of:
a) performing selective laser melting by a laser I to obtain a matrix of a metal material;
b) etching the matrix obtained in step a) by a laser II to form a groove structure, wherein the laser II is a pulse laser;
c) covering the groove structure obtained in step b) with a prefabricated plate, and welding and packaging the prefabricated plate by the laser I to form a microchannel;
d) performing selective laser melting forming on the microchannel structure obtained in step c) to obtain a forming material having the microchannel structure.

Preferably, the laser I is a continuous wave infrared laser or a pulse infrared laser.

Preferably, the laser II comprises a solid pulse laser, a semiconductor pulse laser, a gas pulse laser, and the pulse width of the pulse laser is in a range from 1 femtosecond to 100 milliseconds.

Preferably, the metal material comprises a superalloy, stainless steel, an aluminum alloy, a magnesium alloy and a copper alloy. The superalloy includes at least one of a nickel-based superalloy, a titanium-based superalloy, a tungsten alloy, and a niobium alloy. In the present application, the stainless steel refers to stainless steel other than the superalloy.

Preferably, the edge of the groove structure obtained in step b) is provided with a concave edge, and the depth of the concave edge is consistent with the thickness of the prefabricated plate. The depth of the concave edge is consistent with the thickness of the prefabricated plate to ensure that the packaged prefabricated plate is integrally embedded in the forming matrix, and the packaged surface thereof is flat.

Preferably, the step c) is to cover the groove structure obtained in step b) with the prefabricated plate of the same material as the matrix, through positioning by an external mechanism, applying a welding pressure to the prefabricated plate and welding and packaging the prefabricated plate by the laser I to obtain a forming material having the microchannel structure.

Further preferably, the prefabricated plate is a wall material of the same material as the matrix.

Further preferably, the external mechanism comprises a micro-machine arm and a movement platform; and the applying of the welding pressure includes a mechanical mode, a pneumatic mode and an electromagnetic mode.

According to still another aspect of the present application, an all-laser hybrid additive manufacturing apparatus is provided. On the basis of selective laser melting (SLM), a laser precision packaging method is used to solve the problem of the forming of overhang surface, to solve the problem of microchannel powder residue and to meet the requirements of high precision, high finish and high cleanliness of aerospace key parts processing. The addition and subtraction of the all-laser hybrid additive manufacturing apparatus are all realized by laser.

The all-laser hybrid additive manufacturing apparatus comprises a laser unit, a control unit and a forming unit, and the laser unit is in light path connection with the forming unit, the control unit is electrically connected with the laser unit and the forming unit respectively.

The laser unit comprises a first laser light source and a second laser light source.

The forming unit comprises a welding unit, and the welding unit is controlled by the control unit and is matched with the laser unit for the additive manufacturing.

Preferably, the first laser source comprises a continuous wave infrared laser or a pulse infrared laser. As one specific embodiment, the first laser source is a continuous wave infrared laser.

Preferably, the second laser light source comprises a solid short pulse laser, a semiconductor short pulse laser, a gas short pulse laser. The pulse width of the short pulse laser is in a range from 1 femtosecond to 100 milliseconds.

Preferably, the second laser light source comprises a femtosecond pulse laser, a picosecond pulse laser, a nanosecond pulse laser, a microsecond pulse laser or a millisecond pulse laser.

Preferably, the laser unit comprises a first optical modulation system and a second optical modulation system.

The first optical modulation system is located on an outgoing laser light path of the first laser light source; the first optical modulation system modulates the laser emitted by the first laser light source.

The second optical modulation system is located on an outgoing laser light path of the second laser light source, and the second optical modulation system modulates the laser emitted by the second laser light source.

Further preferably, the laser unit comprises a first mirror.

The first mirror is simultaneously located on an outgoing laser light path of both the first laser light source and the second laser light source, the first mirror transmits infrared light and reflects visible light.

The first laser light source is an infrared laser, and the outgoing laser of the first laser light source passes through the first optical modulation system, and enters the forming unit after directing and passing through the first mirror.

The second laser light source is a visible light laser, and the outgoing laser of the second laser light source passes through the second optical modulation system, and is reflected by means of the first mirror toward the forming unit.

Further preferably, the laser unit comprises a second mirror.

The second mirror is located on the outgoing laser light path of the second laser light source, and the outgoing laser light of the second laser light source is reflected by the second mirror and is directed to the second optical modulation system.

Preferably, the forming unit comprises a forming cavity, a scanning galvanometer, a power spreading system, a motion system.

The welding unit includes a mechanical arm and a pressure applying unit, the mechanical arm is welded through the laser unit for additive manufacturing under the pressure applied by the pressure applying unit.

The pressure applying unit includes mechanical pressure, pneumatic pressure, and electromagnetic pressure.

The forming cavity is provided with an air inlet for charging inert gas and an air outlet for vacuuming.

The scanning galvanometer is located at the top of the forming cavity, and the laser emitted by the laser unit is reflected and is emitted to the bottom of the forming cavity in a scanning mode.

The powder spreading system and the motion system are located at the bottom of the forming cavity.

Preferably, the control unit includes a computer, a laser range finder, a third mirror and an image sensor.

The computer is electrically connected with the laser range finder and the image sensor respectively.

The third mirror is located on the light path of the light emitted by the first laser light source, and the light path of the light beam from the first laser light source passing though the third mirror is the same as that of the laser beam of the laser range finder reflected by the third mirror.

As one specific embodiment, the first laser light source is a 1064 nm of continuous wave fiber laser, and the second laser light source is a 532 nm of picosecond laser.

The benefits brought out by the present application include:

The all-laser hybrid additive manufacturing method and device provided by the present application combines selective laser melting, laser precision removal, and laser precision packaging to solve the problem of forming the overhang surface and the problem of microchannel powder residue, and to meet the requirements of high precision, high finish and high cleanliness of aerospace key parts processing.

List of parts and reference numbers:

| Reference number | Part name |
| --- | --- |
| 2 | laser unit |
| 20 | laser |
| 22 | laser |
| 240 | optical modulator |
| 242 | optical modulator |
| 260 | mirror |
| 262 | mirror |
| 4 | control unit |
| 40 | computer |
| 42 | range finder |
| 44 | mirror |
| 46 | CCD detector |
| 6 | forming unit |
| 60 | forming cavity |
| 600 | air inlet |
| 602 | air outlet |
| 62 | scanning galvanometer |
| 64 | powder spreading system |
| 66 | motion system |
| 68 | welding unit |

DETAILED DESCRIPTION OF THE EMBODIMENT

The present application will be described in detail below with reference to the embodiments, but the application is not limited to these embodiments.

Unless otherwise specified, the raw materials and components in the embodiments of the present application are commercially available.

EXAMPLE 1

Figure 1:
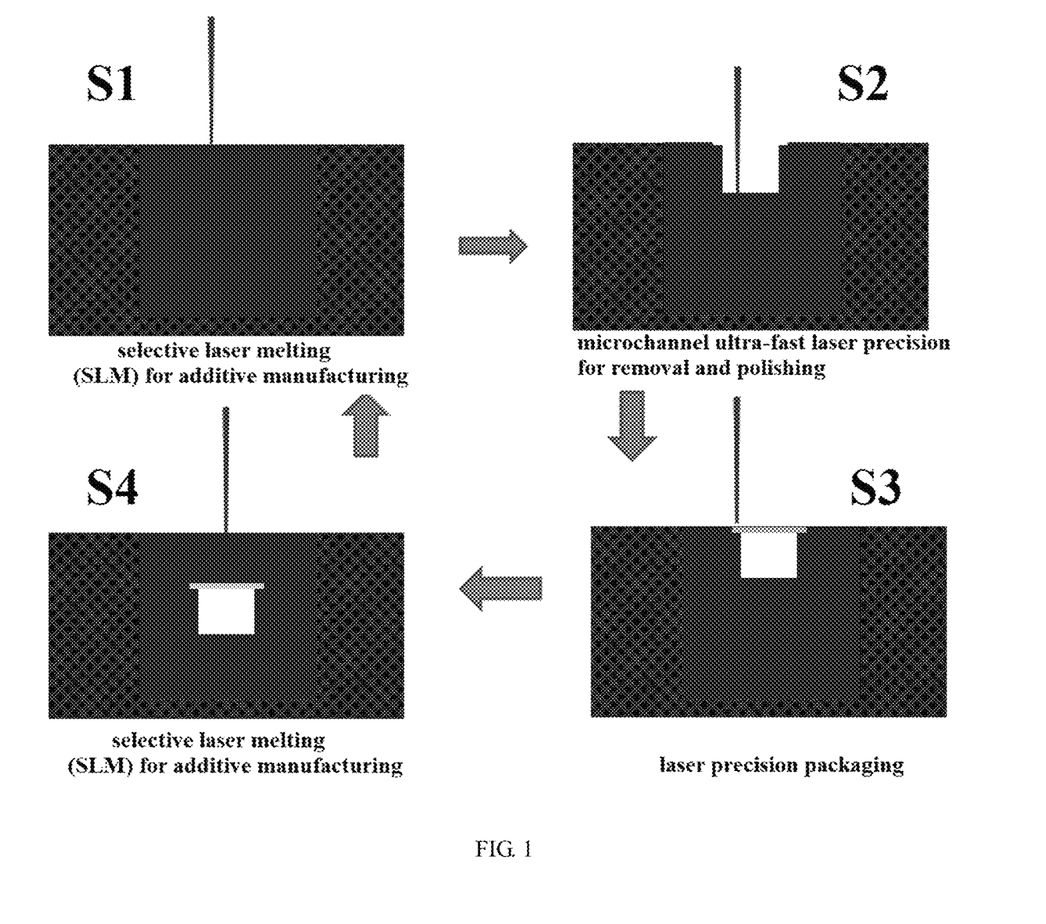
FIG. 1 is a schematic view showing a manufacturing process of the all-laser hybrid additive manufacturing apparatus according to an embodiment of the present application.

The preferred embodiments of the present application will be described in detail below with reference to the accompanying drawings. The manufacturing process of the all-laser hybrid additive manufacturing apparatus of the present application is shown in FIG. 1, wherein:

Step S1, selective laser melting (SLM): 3D printing forming of complex structural parts is performed by using infrared laser;

Step S2, laser fine removal processing: the groove structure is processed on the 3D printing forming part in step S1 by using ultra-fast laser (femtosecond, picosecond), and the laser polishing and finish are carried on the surface of the groove structure improve the finish of the wall and the bottom surface;

Step S3, laser precision packaging: the metal piece is placed above the groove structure formed in step S2, and the position where the metal piece is in contact with the groove structure is welded by using infrared laser to be precisely packaged, so that the metal piece and the 3D printing matrix material are combined in a metallurgy to form microchannel;

Step S4, selective laser melting (SLM): on the 3D printed matrix material packaged in step S3, the additive manufacturing is continued by using infrared laser until the processing is completed.

EXAMPLE 2

The preferred embodiments of the present application will be described in detail below with reference to the accompanying drawings.

Figure 2:
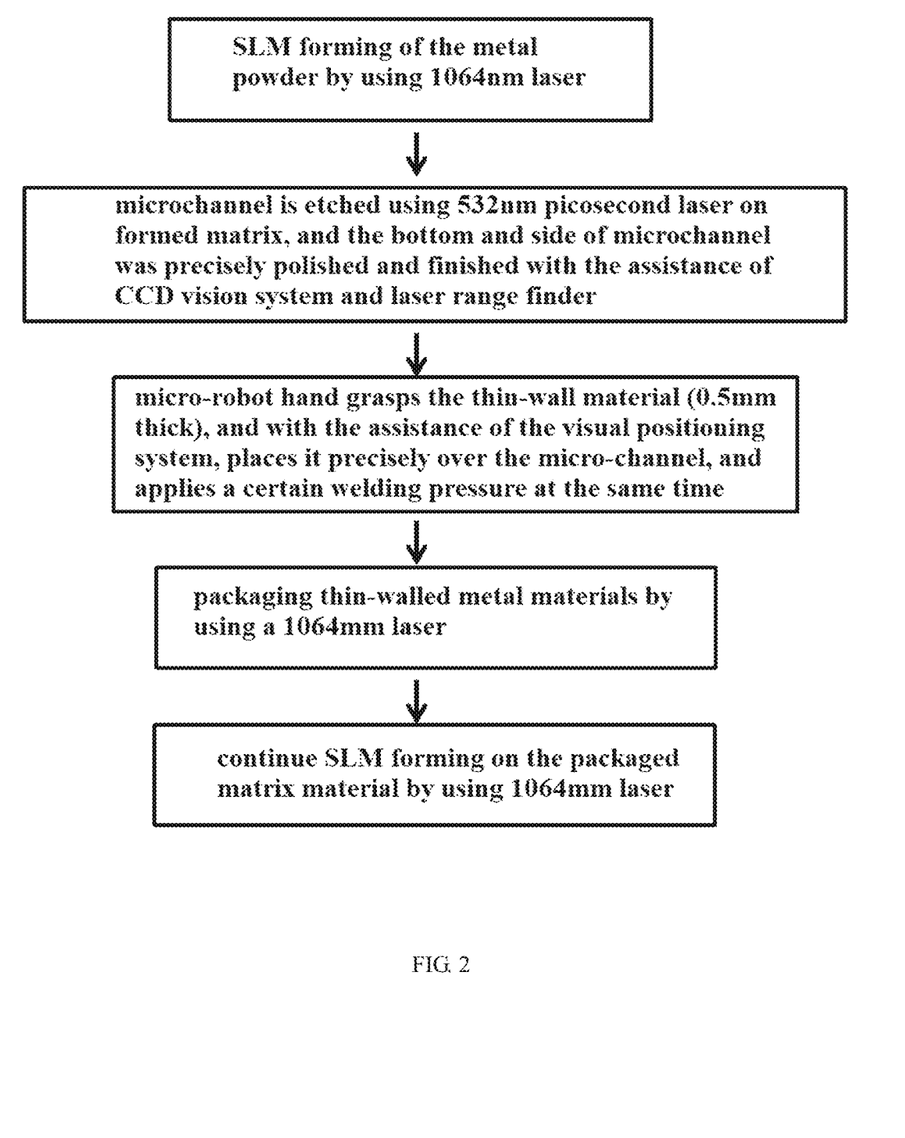
FIG. 2 is a flow chart showing the manufacture of the all-laser hybrid additive manufacturing apparatus according to an embodiment of the present application.

The one-step microchannel processing flow of the manufacturing process for the all-laser hybrid additive manufacturing apparatus of the present application is shown in FIG. 2.

Specifically, after the metal powder spreading was completed by the powder spreading system, the SLM forming of the metal powder is carried out by the 1064 nm infrared continuous wave laser.

Then, with the assistance of the range finder and CCD vision system (CCD detector), the groove structure is processed on the formed part by the 532 nm picosecond green laser, and the laser polishing and finish are carried on the surface of the groove structure to improve the finish of the wall and the bottom surface.

The micro-robot hand is a set of devices that automatically grab, place and press, and the micro-robot hand grabs and places thin-walled materials, and applies welding pressure.

The micro-robot hand is collaborated with a 1064 nm infrared continuous wave laser for the precision packaging of thin-walled materials.

Specifically, after a groove structure (microchannel) is processed on a formed part by a 1064 nm infrared continuous wave laser, a 0.5 mm thick of thin-walled material similar to the SLM forming material is grasped by the micro-robot hand. With the assistance of CCD visual positioning system (CCD detector), it is placed precisely above the groove structure (microchannel) and is applied with pressure. The thin-walled material is welded and packaged by a 1064 nm infrared continuous wave laser. The system is equipped with the CCD vision detection and laser ranging system to collect the shape of the forming features. Then, automatic online dressing, cleaning, packaging and additive manufacturing can be realized through closed-loop according to the CAD model comparison.

After powder is spreaded by the powder spreading system, the SLM forming of the metal powder is performed by a 1064 nm infrared continuous wave laser to complete the microchannel processing process based on one-step SLM forming.

The above process is the manufacturing process of the all-laser hybrid additive manufacturing apparatus of one embodiment of the present application.

EXAMPLE 3

The preferred embodiments of the present application will be described in detail below with reference to the accompanying drawings.

Figure 3:
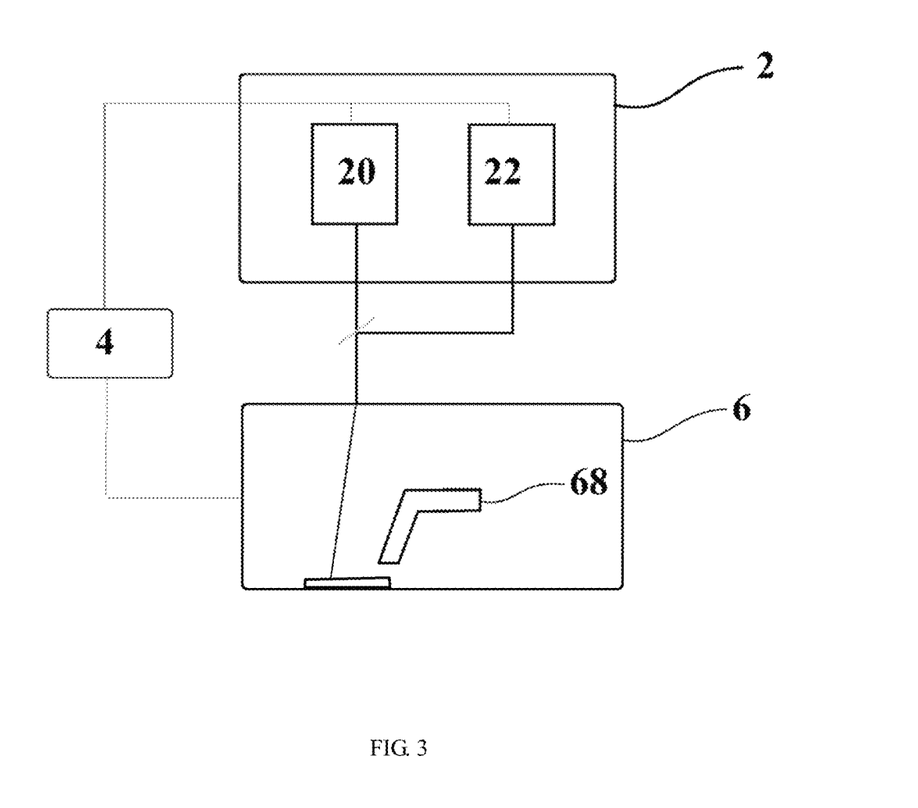
FIG. 3 is a schematic view of an all-laser hybrid additive manufacturing apparatus according to an embodiment of the present application.

FIG. 3 is a structural schematic view of an all-laser hybrid additive manufacturing apparatus according to an embodiment of the present application. As shown in FIG. 3, the apparatus comprises: a laser unit 2, a control unit 4 and a forming unit 6. The laser unit 2 is in light path connection with the forming unit 6, and the control unit 4 is electrically connected with the laser unit 2 and the forming unit 6 respectively.

The laser section 2 includes a laser 20 and a laser 22. The laser 20 is a continuous wave laser and the laser 22 is a short pulse laser.

The forming unit 6 includes a welding unit 68, and welding unit 68 is controlled by the control unit 4 and is matched with the laser unit 2.

The laser 20 is additive manufactured at the bottom of the forming unit 6 to produce a product substrate, then the groove structure is formed through subtractive manufacturing by the laser 22 on the obtained product substrate, and the prefabricated metal plate is placed on the groove structure by the welding unit 68 and is welded and packaged by the laser 20 to obtain a microchannel structure. Specifically, the working mode is shown in FIG. 1, wherein:

Step S1, selective laser melting (SLM): 3D printing forming of complex structural parts is performed by using the laser 20;

Step S2, laser fine removal processing: the laser 22 is an ultra-fast laser (femtosecond, picosecond), the groove structure is processed on the 3D printing forming part in step S1, and the laser polishing and finish are carried on the surface of the groove structure to improve the finish of the wall and the bottom surface;

Step S3, laser precision packaging: the metal piece is placed above the groove structure formed in step S2 by the welding unit 68, and the position where the metal piece is in contact with the groove structure is welded by using the laser 20 to be precisely packaged, so that the metal piece and the 3D printing matrix material are combined in a metallurgy to form microchannel;

Step S4, selective laser melting (SLM): on the 3D printed matrix material packaged in step S3, the additive manufacturing is continued by using infrared laser until the processing is completed.

EXAMPLE 4

Based on the Example 3, the present embodiment provides a specific all-laser hybrid additive manufacturing apparatus. The present embodiment will be described in detail below with reference to the accompanying drawings.

Figure 4:
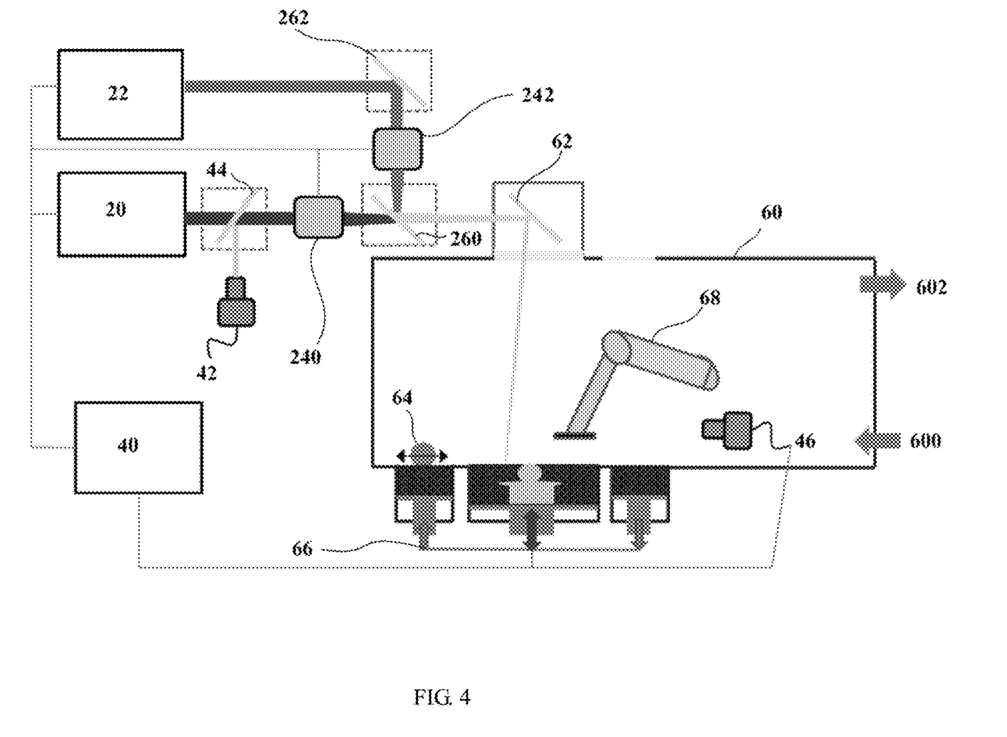
FIG. 4 is a schematic view of an all-laser hybrid additive manufacturing apparatus according to an embodiment of the present application.

FIG. 4 is a structural schematic view of an all-laser hybrid additive manufacturing apparatus according to an embodiment of the present application. As shown in FIG. 3, the apparatus comprises:

Laser unit 2 (not shown in FIG. 4) includes a laser 20, a laser 22, an optical modulator 240, an optical modulator 242, a mirror 260 and a mirror 262. The laser 20 is a continuous wave infrared laser, which uses a 1064 nm fiber laser for 3DSLM forming and precision packaging of complex parts. The laser 22 is a short pulse laser, which uses a 532 nm picosecond laser for microchannel forming and polishing, finshing and the like. The mirror 260 is an infrared light transmitting and visible light reflecting mirror. The 1064 nm continuous wave infrared laser of the laser 20 can pass through the mirror 260, and the 532 nm picosecond green laser of the laser 22 is reflected by the mirror 260.

The control unit 4 (not shown in FIG. 4) includes a computer 40, a range finder 42, a mirror 44 and a CCD detector 46. The range finder 42 and the CCD detecting unit 46 are configured to collect the shape of the forming features. Then automatic online dressing, cleaning, packaging and additive manufacturing can be realized through closed-loop according to the CAD model comparison.

The forming unit 6 (not shown in FIG. 4) includes a forming cavity 60, a scanning galvanometer 62, a powder spreading device 64, a motion system 66 and a welding unit 68. The scanning galvanometer 62 is located at the entrance of the optical path at the top of the forming cavity 60, and reflects the laser beam emitted from the laser unit 2 toward the bottom of the forming cavity 60 and scans for additive manufacturing. The side of the forming cavity 60 has an air inlet 600 for filling the forming cavity with an inert gas, and an air outlet 602 for extracting the gas in the forming cavity 60.

The scanning galvanometer 62 is a dual-wavelength scanning galvanometer. The laser emitted by the laser 20 and the laser 22 enters the forming cavity 60 containing the inert gas through the scanning galvanometer 62. The two types of lasers can realize time-sharing operation through the central control of the computer 40 system.

The laser emitted from the laser 20 passes through the mirror 44, and the mirror 44 is located on the outgoing light path of the laser 20. The light emitted from the laser 20 through the mirror 44, is modulated by the optical modulator 240, and is directed toward and transmitted through the mirror 260, is reflected by the scanning galvanometer 62, and scans at the bottom of forming cavity 60. The range finder 42 is a laser range finder. The ranging laser beam emitted from the range finder 42 is directed to the mirror 44 and reflected. The reflected ranging laser beam is in the same optical path as the laser 20 to measure the distance at which the laser 20 is undergoing selective laser melting.

The powder spreading system 64 is a powder spreading system based on powder bed, the bottom of which is a metal powder spreading system formed by selective laser melting technology (SLM).

The green light laser emitted from the laser 22 is reflected by the mirror 262, modulated by the optical modulator 242, and then directed to the mirror 260 and reflected by the mirror 260.

The welding unit 68 in the forming cavity 60 includes a set of micro-robot hand that that automatically grab, place and press, for gripping and placing the thin-walled material, and simultaneously pressing the thin-walled material to cooperate with the 1064 nm laser of the laser 20 welding for precision packaging.

The computer 40 of the control unit 4 is electrically connected to the laser 20, the laser 22, the optical modulator 240, and the optical modulator 242, respectively, to control the above parts, while being electrically connected to the CCD detector 46 to monitor the material processing in real time.

The laser 20 is additive manufactured at the bottom of the forming unit 6 to produce a product substrate, then the groove structure is formed through subtractive manufacturing by the laser 22 on the obtained product substrate, and the prefabricated metal plate is placed on the groove structure by the welding unit 68 and is welded and packaged by the laser 20 to obtain a microchannel structure. The working mode is shown in FIG. 1, wherein:

Step S1, selective laser melting (SLM): 3D printing forming of complex structural parts is performed by using the laser 20;

Step S2, laser fine removal processing: the laser 22 is an ultra-fast laser (femtosecond, picosecond), the groove structure is processed on the 3D printing forming part in step S1, and the laser polishing and finish are carried on the surface of the groove structure to improve the finish of the wall and the bottom surface;

Step S3, laser precision packaging: the metal piece is placed above the groove structure formed in step S2 by the welding unit 68, and the position where the metal piece is in contact with the groove structure is welded by using the laser 20 to be precisely packaged, so that the metal piece and the 3D printing matrix material are combined in a metallurgy to form microchannel;

Step S4, selective laser melting (SLM): on the 3D printed matrix material packaged in step S3, the additive manufacturing is continued by using infrared laser until the processing is completed.

Specifically, in this embodiment, one-step microchannel processing flow is shown in FIG. 2. After powder is spreaded by the powder spreading system at the bottom of the forming cavity 60, the laser 20 emitting the 1064 nm infrared continuous wave fiber laser is controlled by the computer 40, and the 1064 nm infrared continuous wave fiber laser is reflected to the bottom of the forming cavity 60 by the scanning galvanometer 62 and scanned for SLM forming of the metal powder. At this time the laser 22 is controlled by the computer 40 not to start.

The picosecond green light (532 nm) laser of the laser 22 is controlled by the computer 40, the groove structure is processed on the formed piece, and the laser polishing and finish are carried on the surface of the groove structure to improve the finish of the wall and bottom surface with the assistance of the range finder 42 and the CCD detector 46.

The forming cavity 60 is provided with the welding unit 68 inside. The welding unit 68 is a set of micro-robot hands that can automatically grasp, place and press, for gripping, placing and pressing the thin-wall material, and is collaborated with a 1064 nm infrared continuous wave laser for the precision packaging. Specifically, after the groove structure (microchannel) is processed on the formed part by the laser 22, a 0.5 mm thick of thin-walled material similar to the SLM forming material is grasped by the micro-robot hand of the welding unit 68. With the assistance of the visual positioning system (CCD detector 46), it is placed precisely above the groove structure (microchannel) and is applied with pressure. The thin-walled material is welded and packaged by the laser 20 controlled by the computer 40. The CCD vision detection and laser ranging system are set up by the system to collect the shape of the forming features. Then, automatic online dressing, cleaning, packaging and additive manufacturing can be realized through closed-loop according to the CAD model comparison.

After powder is spreaded on the bottom of the forming cavity 60 by the powder spreading system 64, the laser 20 emitting the 1064 nm infrared continuous wave fiber laser is controlled by the computer 40 and the emitting the 1064 nm infrared continuous wave fiber laser is reflected by the scanning galvanometer 62 to the bottom of the forming cavity 60 and scanned for SLM forming of the metal powder to complete the microchannel processing process based on one-step SLM forming. The above process is the manufacturing process of the all-laser hybrid additive manufacturing apparatus of one embodiment of the present application.

The above description is only a few examples of the present application, and is not intended to limit the scope of the application in any form. While the present application has been disclosed above with the reference to preferred embodiments, but these embodiments are not intended to limit the application. Without departing from the scope of the technical solution, any one skilled in the art make a slight change or modification with the technical content disclosed above, is equivalent to the equivalent embodiment, and belongs to the scope of the technical solution.

What is claimed is:

1. An all-laser hybrid additive manufacturing method, wherein after a matrix is obtained by means of selective laser melting, a subtractive forming is carried out on the matrix by means of a pulse laser to form a groove structure, and the groove structure is then packaged to obtain a forming material with a microchannel;
   wherein the method comprises the steps of:
   a) performing selective laser melting by a laser I to obtain the matrix of a metal material;
   b) etching the matrix obtained in step a) by a laser II to form the groove structure, wherein the laser II is a pulse laser;
   c) covering the groove structure obtained in step b) with a prefabricated plate, and welding and packaging the prefabricated plate by the laser I to form the microchannel;
   d) performing selective laser melting on the microchannel structure obtained in step c) to obtain the forming material having the microchannel structure;
   wherein the method is implemented by an all-laser hybrid additive manufacturing apparatus, and the apparatus comprises a laser unit, a control unit and a forming unit, and the laser unit is in light path connection with the forming unit, the control unit is electrically connected with the laser unit and the forming unit respectively;
   the laser unit comprises laser I and laser II;
   the forming unit comprises an external mechanism, and the external mechanism corresponds with the laser unit for additive manufacturing,
   wherein an edge of the groove structure obtained in step b) is provided with a concave edge, and the depth of the concave edge is consistent with the thickness of the prefabricated plate;
   the step c) is to cover the groove structure obtained in step b) with the prefabricated plate of the same material as the matrix, through positioning by an external mechanism, applying a welding pressure to the prefabricated plate and welding and packaging the prefabricated plate by the laser I to obtain the forming material having the microchannel structure.

2. The method according to claim 1, wherein the laser unit comprises a first optical modulation system and a second optical modulation system;
   the first optical modulation system is located on an outgoing laser light path of laser I, the first optical modulation system modulates the laser emitted by laser I;
   the second optical modulation system is located on an outgoing laser light path of laser II, the second optical modulation system modulates the laser emitted by laser II;
   the laser unit comprises a first mirror; the first mirror is simultaneously located on an outgoing laser light path of both laser I and laser II, the first mirror transmits infrared light and reflects visible light; laser I is an infrared laser, and the outgoing laser of laser I passes through the first optical modulation system, and enters the forming unit after directing and passing through the first mirror;
   laser II is a visible light laser, and the outgoing laser of laser II passes through the second optical modulation system, and is reflected by means of the first mirror toward the forming unit;
   the laser unit comprises a second mirror; the second mirror is located on the outgoing laser light path of laser II, and the outgoing laser light of laser II is reflected by the second mirror and is directed to the second optical modulation system.

3. The method according to claim 1, wherein the laser I is a continuous wave infrared laser or a pulse infrared laser, the laser II comprises a solid pulse laser, a semiconductor pulse laser, or a gas pulse laser, and the pulse width of the solid pulse laser, the semiconductor pulse laser, or the gas pulse laser is in a range from 1 femtosecond to 100 milliseconds.

4. The method according to claim 3, wherein laser II comprises a femtosecond pulse laser, a picosecond pulse laser, a nanosecond pulse laser, a microsecond pulse laser or a millisecond pulse laser.

5. The method according to claim 1, wherein the metal material comprises a superalloy, stainless steel, an aluminum alloy, a magnesium alloy or a copper alloy.

6. An all-laser hybrid additive manufacturing method, wherein after a matrix is obtained by means of selective laser melting, a subtractive forming is carried out on the matrix by means of a pulse laser to form a groove structure, and the groove structure is then packaged to obtain a forming material with a microchannel;
   wherein the method comprises the steps of:
   a) performing selective laser melting by a laser I to obtain the matrix of a metal material;
   b) etching the matrix obtained in step a) by a laser II to form the groove structure, wherein the laser II is a pulse laser;
   c) covering the groove structure obtained in step b) with a prefabricated plate, and welding and packaging the prefabricated plate by the laser I to form the microchannel;
   d) performing selective laser melting on the microchannel structure obtained in step c) to obtain the forming material having the microchannel structure;
   wherein the method is implemented by an all-laser hybrid additive manufacturing apparatus, and the apparatus comprises a laser unit, a control unit and a forming unit, and the laser unit is in light path connection with the forming unit, the control unit is electrically connected with the laser unit and the forming unit respectively;
   the laser unit comprises laser I and laser II;
   the forming unit comprises an external mechanism, and the external mechanism corresponds with the laser unit for additive manufacturing,
   wherein an edge of the groove structure obtained in step b) is provided with a concave edge, and the depth of the concave edge is consistent with the thickness of the prefabricated plate;

the step c) is to cover the groove structure obtained in step b) with the prefabricated plate of the same material as the matrix, through positioning by an external mechanism, applying a welding pressure to the prefabricated plate and welding and packaging the prefabricated plate by the laser I to obtain the forming material having the microchannel structure, wherein the external mechanism comprises a micro-machine arm and a movement platform, and the applying of the welding pressure includes a mechanical mode, a pneumatic mode or an electromagnetic mode.

7. The method according to claim 6, wherein the laser I is a continuous wave infrared laser or a pulse infrared laser, the laser II comprises a solid pulse laser, a semiconductor pulse laser, or a gas pulse laser, and the pulse width of the solid pulse laser, the semiconductor pulse laser, or the gas pulse laser is in a range from 1 femtosecond to 100 milliseconds.

8. The method according to claim 7, wherein laser II comprises a femtosecond pulse laser, a picosecond pulse laser, a nanosecond pulse laser, a microsecond pulse laser or a millisecond pulse laser.

9. The method according to claim 6, wherein the metal material comprises a superalloy, stainless steel, an aluminum alloy, a magnesium alloy or a copper alloy.

10. The method according to claim 6, wherein the laser unit comprises a first optical modulation system and a second optical modulation system;
the first optical modulation system is located on an outgoing laser light path of laser I, the first optical modulation system modulates the laser emitted by laser I;
the second optical modulation system is located on an outgoing laser light path of laser II, the second optical modulation system modulates the laser emitted by laser II; the laser unit comprises a first mirror;
the first mirror is simultaneously located on an outgoing laser light path of both laser I and laser II, the first mirror transmits infrared light and reflects visible light;
laser I is an infrared laser, and the outgoing laser of laser I passes through the first optical modulation system, and enters the forming unit after directing and passing through the first mirror;
laser II is a visible light laser, and the outgoing laser of laser II passes through the second optical modulation system, and is reflected by means of the first mirror toward the forming unit;
the laser unit comprises a second mirror; the second mirror is located on the outgoing laser light path of laser II, and the outgoing laser light of laser II is reflected by the second mirror and is directed to the second optical modulation system.

11. An all-laser hybrid additive manufacturing method, wherein after a matrix is obtained by means of selective laser melting, a subtractive forming is carried out on the matrix by means of a pulse laser to form a groove structure, and the groove structure is then packaged to obtain a forming material with a microchannel;
wherein the method comprises the steps of:
a) performing selective laser melting by a laser I to obtain the matrix of a metal material;
b) etching the matrix obtained in step a) by a laser II to form the groove structure, wherein the laser II is a pulse laser;
c) covering the groove structure obtained in step b) with a prefabricated plate, and welding and packaging the prefabricated plate by the laser I to form the microchannel;
d) performing selective laser melting on the microchannel structure obtained in step c) to obtain the forming material having the microchannel structure; edge
wherein the method is implemented by an all-laser hybrid additive manufacturing apparatus, and the apparatus comprises a laser unit, a control unit and a forming unit, and the laser unit is in light path connection with the forming unit, the control unit is electrically connected with the laser unit and the forming unit respectively;
the laser unit comprises laser I and laser II;
the forming unit comprises an external mechanism, and the external mechanism corresponds with the laser unit for additive manufacturing,
wherein the forming unit comprises a forming cavity, a scanning galvanometer, a power spreading system and a motion system;
the external mechanism includes a mechanical arm and a pressure applying unit, the mechanical arm is used in unison with the laser unit to perform welding for additive manufacturing under the pressure applied by the pressure applying unit;
the pressure applying unit can use at least one of the following mechanisms: mechanical pressure, pneumatic pressure, or electromagnetic pressure;
the forming cavity is provided with an air inlet for charging inert gas and an air outlet for vacuuming;
the scanning galvanometer is located at the top of the forming cavity, and the laser emitted by the laser unit is reflected and is emitted to the bottom of the forming cavity in a scanning mode;
the powder spreading system and the motion system are located at the bottom of the forming cavity;
the control unit includes a computer, a laser range finder, a third mirror and an image sensor;
the computer is electrically connected with the laser range finder and the image sensor respectively;
the third mirror is located on the light path of the light emitted by laser I, and the light path of the light beam from laser I passing through the third mirror is the same as that of the laser beam of the laser range finder reflected by the third mirror;
laser I is a 1064 nm continuous wave fiber laser, and laser II is a 532 nm picosecond laser.

12. The method according to claim 11, wherein the laser I is a continuous wave infrared laser or a pulse infrared laser, the laser II comprises a solid pulse laser, a semiconductor pulse laser, or a gas pulse laser, and the pulse width of the solid pulse laser, the semiconductor pulse laser, or the gas pulse laser is in a range from 1 femtosecond to 100 milliseconds.

13. The method according to claim 12, wherein laser II comprises a femtosecond pulse laser, a picosecond pulse laser, a nanosecond pulse laser, a microsecond pulse laser or a millisecond pulse laser.

14. The method according to claim 11, wherein the metal material comprises a superalloy, stainless steel, an aluminum alloy, a magnesium alloy and a copper alloy.

15. The method according to claim 11, wherein the laser unit comprises a first optical modulation system and a second optical modulation system;
the first optical modulation system is located on an outgoing laser light path of laser I, the first optical modulation system modulates the laser emitted by laser I;

the second optical modulation system is located on an outgoing laser light path of laser II, the second optical modulation system modulates the laser emitted by laser II; the laser unit comprises a first mirror;

the first mirror is simultaneously located on an outgoing laser light path of both laser I and laser II, the first mirror transmits infrared light and reflects visible light;

laser I is an infrared laser, and the outgoing laser of laser I passes through the first optical modulation system, and enters the forming unit after directing and passing through the first mirror;

laser II is a visible light laser, and the outgoing laser of laser II passes through the second optical modulation system, and is reflected by means of the first mirror toward the forming unit;

the laser unit comprises a second mirror;

the second mirror is located on the outgoing laser light path of laser II, and the outgoing laser light of laser II is reflected by the second mirror and is directed to the second optical modulation system.

* * * * *